US008786225B2

(12) United States Patent
Yokokawa et al.

(10) Patent No.: US 8,786,225 B2
(45) Date of Patent: Jul. 22, 2014

(54) INVERTER POWER GENERATOR

(75) Inventors: Narutoshi Yokokawa, Mishima (JP);
Tomoyuki Hoshikawa, Numazu (JP);
Kazumi Murata, Numazu (JP); Junichi Kanai, Niigata (JP); Naoyuki Mashima, Tsubame (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/416,696

(22) Filed: Mar. 9, 2012

(65) Prior Publication Data
US 2012/0229063 A1 Sep. 13, 2012

(30) Foreign Application Priority Data
Mar. 11, 2011 (JP) ................. 2011-054516

(51) Int. Cl.
*H02P 6/16* (2006.01)
*H02P 7/00* (2006.01)
*G06F 19/00* (2011.01)

(52) U.S. Cl.
USPC ............... 318/400.07; 318/434; 701/38

(58) Field of Classification Search
USPC ................. 318/400.07, 434; 701/36
See application file for complete search history.

(56) References Cited

U.S. PATENT DOCUMENTS

| 6,492,785 | B1 * | 12/2002 | Kasten et al. | 318/434 |
| 7,528,585 | B2 * | 5/2009 | Maehara | 322/59 |
| 2007/0247119 | A1 * | 10/2007 | Maehara | 322/28 |
| 2010/0070133 | A1 * | 3/2010 | Ishishita | 701/36 |

FOREIGN PATENT DOCUMENTS

| JP | 2005-229675 | 8/2005 |
| JP | 2010-110062 | 5/2010 |
| KR | 2004-0081376 | 9/2004 |

OTHER PUBLICATIONS

English Language Abstract of JP 2010-110062 published May 13, 2010.
English Language Translation of JP 2010-110062 published May 13, 2010.
Korean Office Action issued in KR 10-2012-24340 on Mar. 26, 2013.
Partial English Language Translation of Korean Office Action issued in KR 10-2012-24340 on Mar. 26, 2013.
English Language Abstract of JP 2005-229675 published Aug. 25, 2005.
English Language Translation of JP 2005-229675 published Aug. 25, 2005.
English Language Abstract of KR 2004-0081376 published on Sep. 21, 2004.

* cited by examiner

*Primary Examiner* — Eduardo Colon Santana
*Assistant Examiner* — Gabriel Agared
(74) *Attorney, Agent, or Firm* — DLA Piper LLP (US)

(57) ABSTRACT

An inverter power generator includes a current controller 14a setting a current limit ratio according to a rotation speed of a synchronous motor 13 and controls a converter current according to the current limit ratio. The current controller sets the current limit ratio to 70% if the synchronous motor is at a rotational speed equal to an idle speed of an engine 11. Until the rotational speed of the synchronous motor reaches a rated speed, the output current limiter linearly increases the current limit ratio up to 100%. With this, the rotational speed of the engine becomes reasonably increasable even if a sudden load increase occurs when the engine is operating at low speed.

1 Claim, 11 Drawing Sheets

INVERTER POWER GENERATOR

BACKGROUND OF THE INVENTION

1. Field of the Invention

The present invention relates to an inverter power generator that generates AC power with a synchronous motor driven by a prime mover such as an engine, converts the AC power into DC power, and inverts the DC power with an inverter into AC power of a required frequency.

2. Description of Related Art

The inverter power generator is widely used to generate electric power with the use of a prime mover such as an engine. The inverter power generator connects an output shaft of the engine to a rotary shaft of a synchronous motor, drives the synchronous motor with the engine to generate AC power, converts the AC power with a converter into DC power, and inverts the DC power with an inverter into AC output power of required voltage and frequency. The AC output power is supplied to a load such as a motor, a lamp, or the like that is connected to the inverter.

An example of the inverter power generator is disclosed in Japanese Unexamined Patent Application Publication No. 2010-110062 (Patent Document 1). This related art calculates power generated by an engine before and after a change occurs in a load, finds a difference in the generated power between before and after the load change, and if the difference is larger than a threshold, increases the rotation speed of the engine. This technique changes the rotational speed of the engine without loosing a good operation feeling.

To improve energy efficiency, the inverter power generator is required to reduce the rotational speed of the engine as low as possible. Driving the engine at low speed, however, causes a problem when the load suddenly changes to increase power demand of the converter. To meet the increased power demand, the engine must increase its rotational speed. The engine, however, is unable to rapidly increase its rotational speed and to stall.

SUMMARY OF THE INVENTION

As mentioned above, the inverter power generator is required to improve energy efficiency by lowering the rotational speed of the engine. The related art of Patent Document 1, however, does not disclose a solution to the problem that the engine stalls if it is driven at low speed. There is a necessity for a technique to prevent the engine from stalling when it is operated at low speed.

To meet the necessity, the present invention provides an inverter power generator capable of continuously operating a prime mover such as an engine without stalling the same even if a sudden load change occurs when the prime mover is operated at low speed.

According to an aspect of the present invention, the inverter power generator includes a prime mover, a synchronous motor coupled with the prime mover, a converter connected to the synchronous motor, an inverter connected to the converter, and a capacitor arranged between the converter and the inverter. The prime mover rotates the synchronous motor in order to generate AC power, the converter converts the AC power into DC power, and the inverter inverts the DC power into AC power of a required frequency. The converter includes a current controller that sets a current limit ratio according to a rotational speed of the synchronous motor and limits a converter current according to the current limit ratio. The current controller sets the current limit ratio lower than 100% if the synchronous motor is at a predetermined rotation speed lower than a rated rotational speed and linearly increases the current limit ratio up to 100% according to an increase in the rotational speed of the synchronous motor.

DESCRIPTION OF PREFERRED EMBODIMENTS

Figure 1:
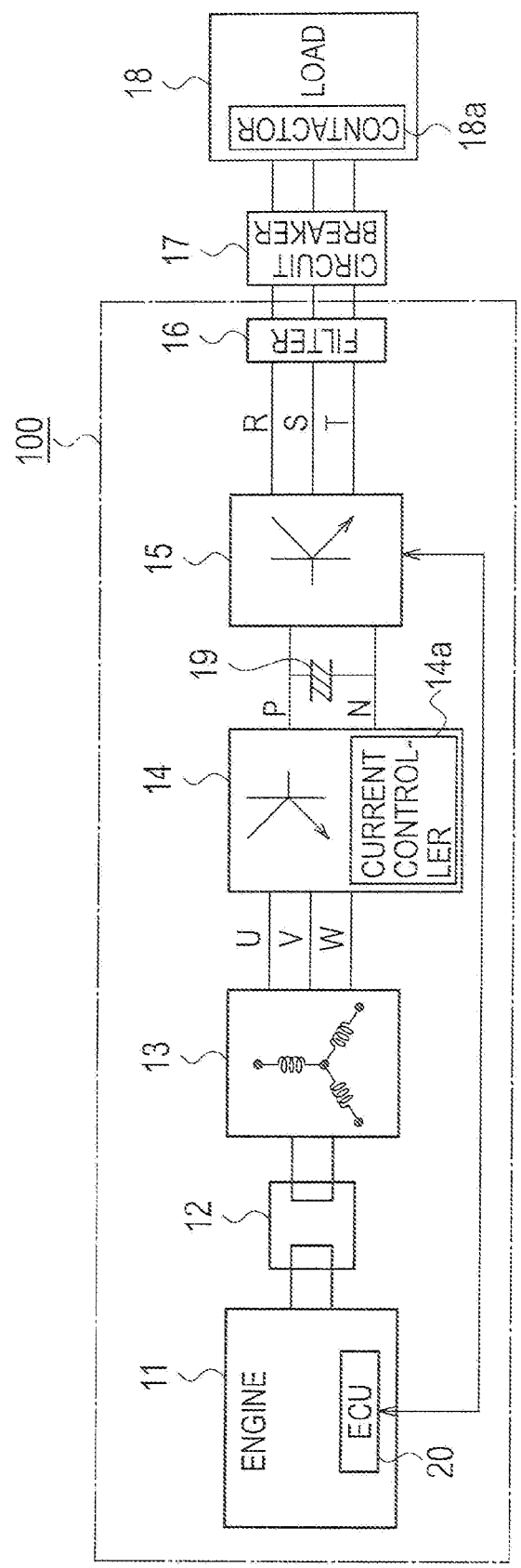
FIG. 1 is a block diagram illustrating an inverter power generator according to an embodiment of the present invention.

An inverter power generator according to an embodiment of the present invention will be explained with reference to the drawings. FIG. 1 is a block diagram illustrating the inverter power generator 100 according to the embodiment. The inverter power generator 100 includes a prime mover, i.e., an engine 11 such as a diesel engine, a gasoline engine, or the like, a synchronous motor 13 that is driven by the engine 11 and generates three-phase (U, V, W) AC voltage, a coupling 12 that couples an output shaft of the engine 11 and a rotation shaft of the synchronous motor 13 with each other, a converter 14 that is electrically connected to the synchronous motor 13 and converts the three-phase AC voltage into PN DC voltage, an inverter 15 that inverts the PN DC voltage into three-phase (R, S, T) AC voltage, a main-circuit capacitor 19 that is arranged in wiring that electrically connects the converter 14 and inverter 15 to each other, and an LC filter 16 that is connected to the inverter 15 and reduces switching noise.

The LC filter 16 is connected through a circuit breaker 17 to a load 18 such as an induction motor. Although FIG. 1 illustrates one circuit breaker 17 and one load 18, it is general to arrange a plurality of circuit breakers and loads after the LC filter 16. If the load 18 is an induction motor, it is general to arrange a contactor 18a in a first stage of the load 1, to start and stop the induction motor. The synchronous motor 13 may be an IPM motor that embeds permanent magnets in a rotor.

The engine 11 is connected to an ECU (engine control unit) 20 that controls the rotation of the engine 11.

The converter 14 has semiconductor switching elements such as transistors, IGBTs, MOSFETs, or the like and diodes.

With these switching elements, the converter 14 converts three-phase (U, V, W) AC voltage into PN DC voltage. According to power consumption of the load 18, the converter 14 supplies a proper current to the synchronous motor 13, to generate required power without frequently changing the rotation speed of the engine 11. Unlike a conventional rectifier, the converter 14 converts the three-phase AC voltage generated by the synchronous motor 13 into PN DC voltage of a required magnitude, and at the same time, supplies a current to the synchronous motor 13 according to output power to the load 18 so that the synchronous motor 13 may stably generate power in response to variations in the load 18. The converter 14 includes a current controller (an output current limiter) 14a (FIG. 8) that limits a current passing through the synchronous motor 13. The details of the current controller 14a will be explained later.

The main-circuit capacitor 19 smoothes the PN DC voltage of the converter 14 and accumulates power so that the inverter 15 may output large power.

Similar to the converter 14, the inverter 15 has semiconductor switching elements such as transistors, IGBTs, MOSFETs, or the like and diodes. With these switching elements, the inverter 15 inverts the smoothed PN DC voltage into three-phase (R, S, T) AC voltage. By changing switching patterns of the switching elements from one to another, the inverter 15 is able to output an optional voltage value and an optional frequency value.

Figure 2:
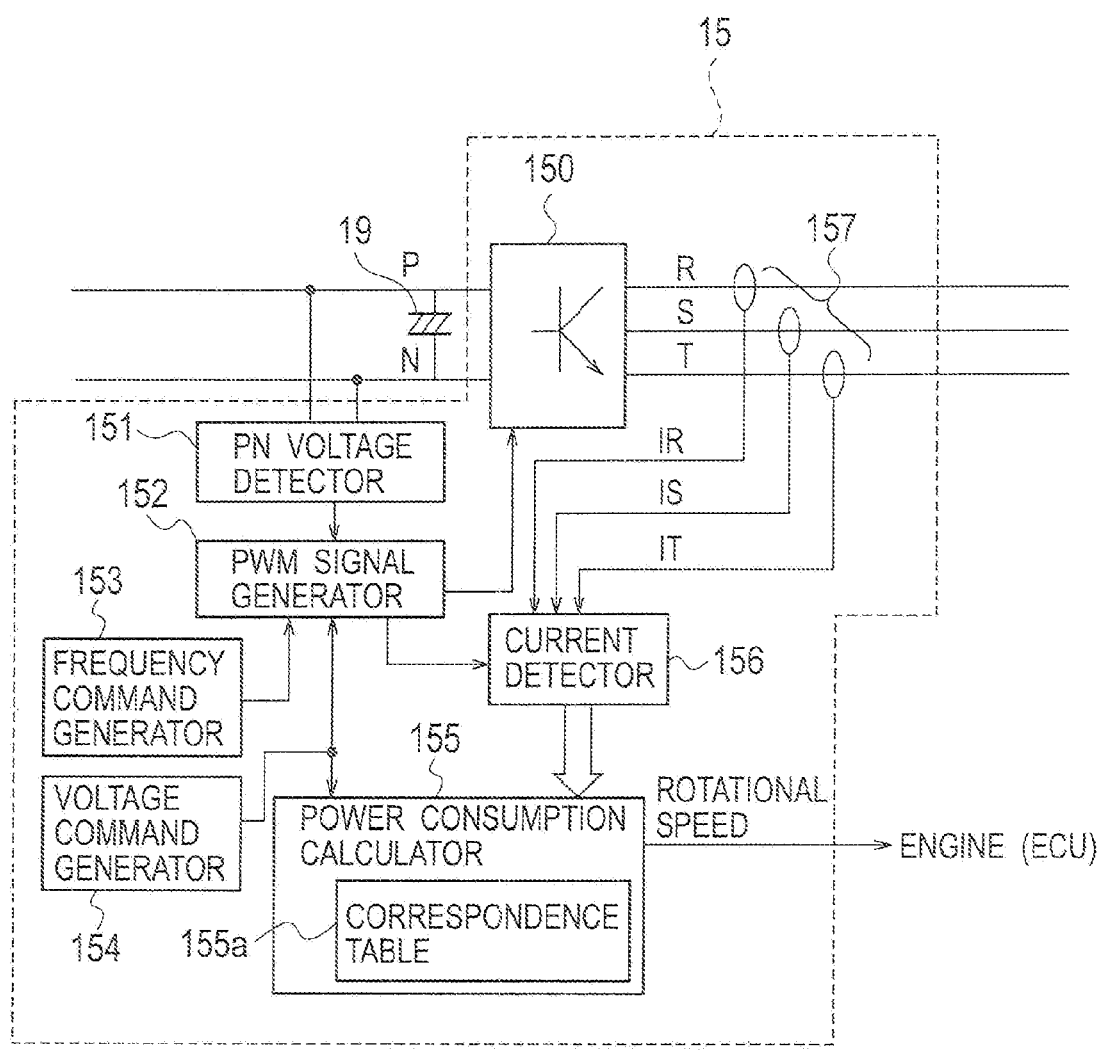
FIG. 2 is a block diagram illustrating an inverter of the inverter power generator of FIG. 1.

FIG. 2 is a block diagram illustrating the details of the inverter 15. The inverter 15 includes a switching circuit 150 that employs semiconductor switching elements to invert PN DC voltage into three-phase AC voltage, a PN voltage detector 151 that detects a voltage of the main-circuit capacitor 19, a frequency command generator 153 that outputs a frequency command value for the three-phase AC voltage to be generated by the switching circuit 150, and a voltage command generator 154 that outputs a voltage command value for the three-phase AC voltage to be generated by the switching circuit 150.

The inverter 15 also includes a PWM signal generator 152 that generates a PWM signal according to the frequency command value of the frequency command generator 153, the voltage command value of the voltage command generator 154, and the detected PN voltage value of the PN voltage detector 151 and outputs the PWM signal to the switching circuit 150.

The inverter 15 also includes an ammeter (current detector) 157 that detects R-, S-, and T-phase line currents IR, IS, and IT outputted from the switching circuit 150, a current detector 156 that provides two-phase axial (d-axis, q-axis) current signals according to the line currents IR, IS, and IT from the ammeter 157 and the PWM signal from the PWM signal generator 152, and a power consumption calculator 155 that calculates power consumption of the load 18 (FIG. 1) according to the two-phase axial current signals of the current detector 156.

Figure 10:
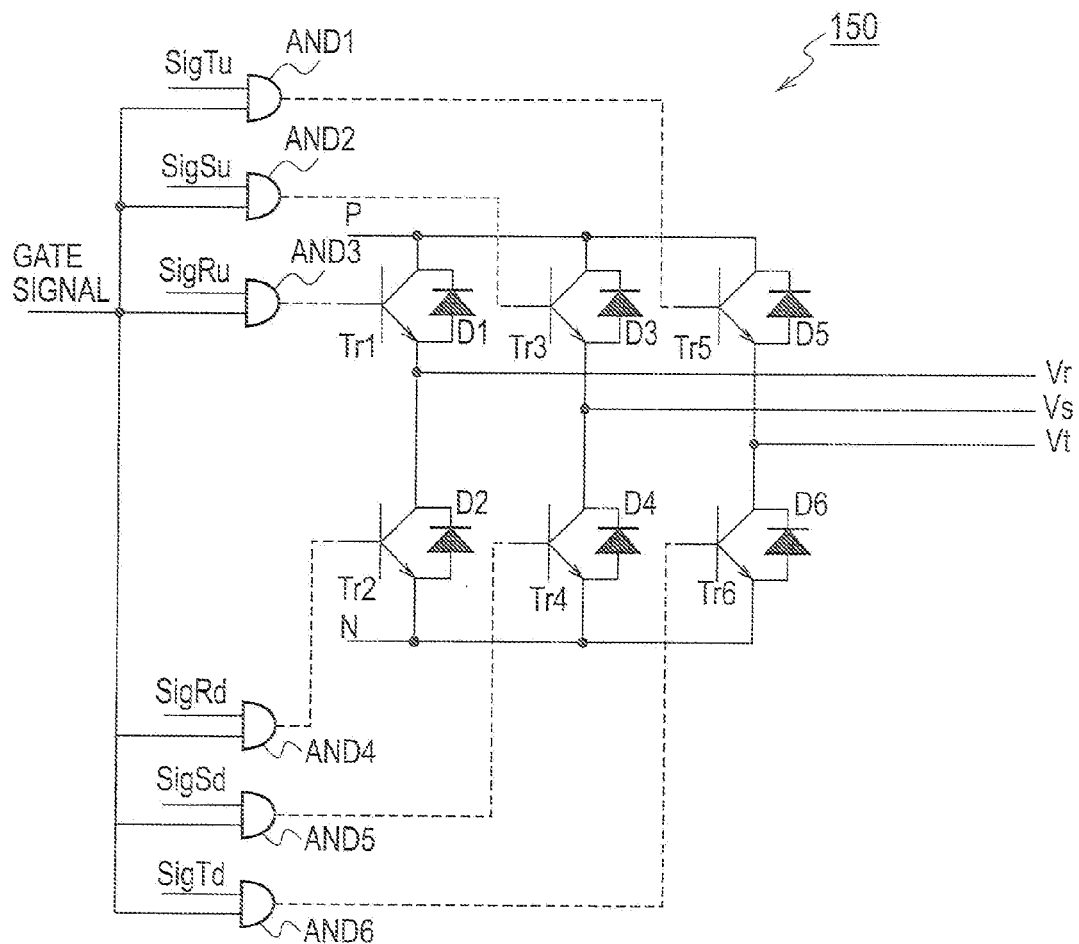
FIG. 10 is a circuit diagram illustrating a switching circuit of in the inverter of FIG. 2.

The switching circuit 150 includes, as illustrated in FIG. 10, six transistors Tr1 to Tr6 and diodes D1 to D6 connected in parallel with the transistors Tr1 to Tr6, respectively. The transistors Tr1 and Tr2 are connected in series. A collector of the transistor Tr1 is connected to a positive (P) electrode. An emitter of the transistor Tr2 is connected to a negative (N) electrode. A connection point between the transistors Tr1 and Tr2 is an output point for providing an R-phase voltage Vr. Similarly, the transistors Tr3 and Tr4 are connected in series and a connection point between them is an output point for providing an S-phase voltage Vs. The transistors Tr5 and Tr6 are connected in series and a connection point between them is an output point for providing a T-phase voltage Vt.

The switching circuit 150 also includes six AND gates AND1 to AND6. A first input terminal of each of the AND gates AND1 to AND6 receives a gate signal to control power supply. Second terminals of the AND gates AND1 to AND6 receive PWM signals SigTu, SigSu, SigRu, SigRd, SigSd, and SigTd, respectively, outputted from the PWM signal generator 152. When the gate signal is ON (high level), the respective PWM signals drive the transistors Tr1 to Tr6, to provide the three-phase AC voltages Vr, Vs, and Vt. When the gate signal is OFF (low), the transistors Tr1 to Tr6 are inactive without regard to the PWM signals. The transistors Tr1, Tr3, and Tr5 and diodes D1, D3, and D5 on an upper side of the switching circuit 150 form an upper arm and the transistors Tr2, Tr4, and Tr6 and diodes D2, D4, and D6 on a lower side of the switching circuit 150 form a lower arm.

The power consumption calculator 155 (FIG. 2) is provided with a correspondence table 155a that indicates a relationship between power consumption and engine rotation speed. The power consumption calculator 155 calculates power consumption of the load 18, and according to the calculated power consumption and the correspondence table 155a, finds rotation speed data for the engine 11. The rotation speed data is transmitted to the ECU 20 of the engine 11. According to the transmitted rotation speed data, the ECU 20 controls the engine 11 to a required engine speed.

Figure 7:
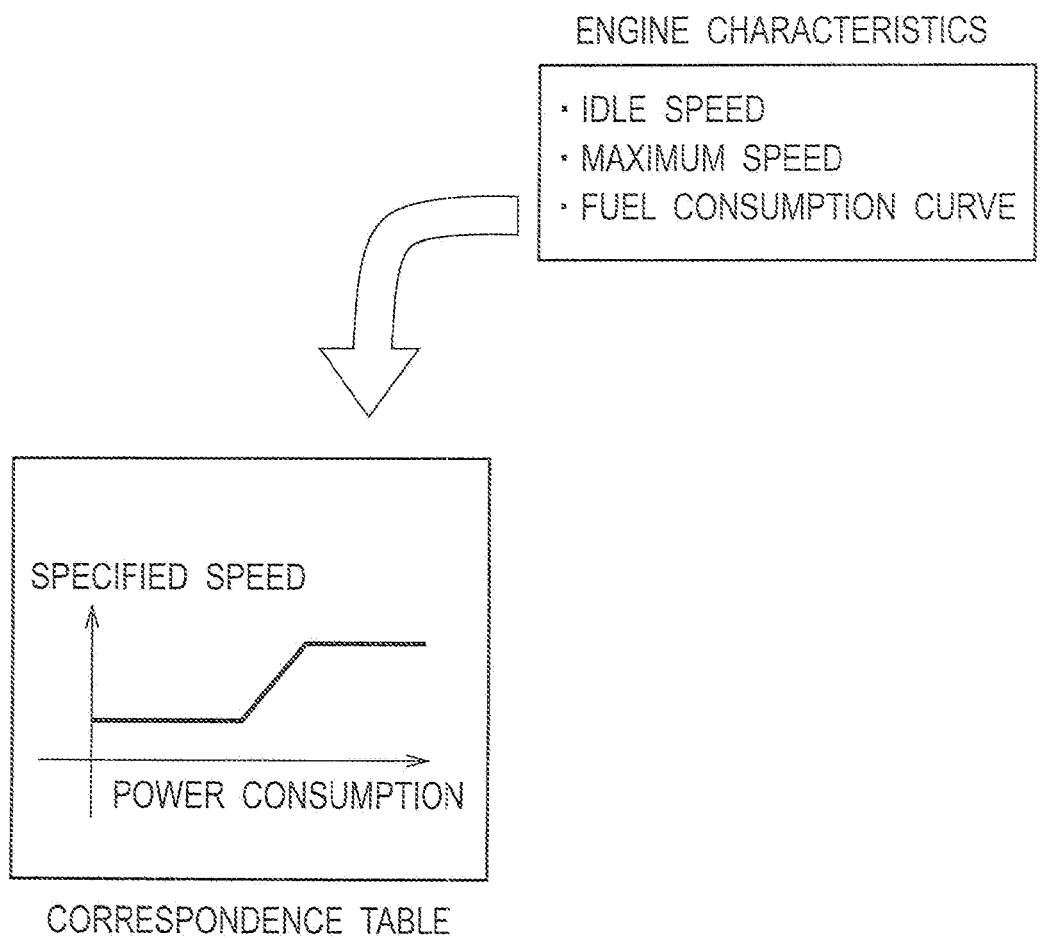
FIG. 7 is a view illustrating a correspondence table used by a power consumption calculator of the inverter of FIG. 2.

The correspondence table 155a indicates, as illustrated in FIG. 7, a relationship between power consumption of the load 18 and rotational speed of the engine 11. The correspondence table 155a is prepared according to a fuel consumption curve of the engine 11 and is used to find a proper rotational speed of the engine 11 to generate power that meets the power consumption of the load 18 together with a predetermined margin. According to the embodiment, the engine 11 is set to an idle rotation speed if the power consumption of the load 18 is low or zero, and as the power consumption increases, is linearly increased and clamped at a maximum rotation speed.

The details of the PWM signal generator 152 and current detector 156 will be explained with reference to FIG. 3. The PWM signal generator 152 includes a voltage corrector 31 that corrects a q-axis voltage contained in a two-phase (d-axis, q-axis) voltage command value, a 2-to-3 phase converter 32, a PWM waveform converter 33 that generates a three-phase PWM signal according to a three-phase (R, S, T) voltage signal, and an electric angle generator 34.

The voltage corrector 31 multiplies the voltage command value by a ratio of (Set PN voltage value)/(Detected PN voltage value), i.e., a ratio of (Set PN voltage value)/(Feedback PN voltage value), thereby correcting the q-axis voltage contained in the voltage command value. The corrected q-axis voltage is supplied to the 2-to-3 phase converter 32.

The 2-to-3 phase converter 32 carries out 2-to-3 phase conversion according to the corrected q-axis voltage and a d-axis voltage contained in the voltage command value, so that the PWM signal generator 152 may generate three-phase (R, S, T), six-arm PWM signals. The generated PWM signals (SigTu, SigSu, SigRu, SigRd, SigSd, SigTd) are supplied to the switching circuit 150 (FIG. 2), to drive the transistors Tr1 to Tr6 (FIG. 10).

The electric angle generator 34 finds an electric angle for the three-phase (R, S, T) voltage according to a frequency command value from the frequency command generator 153 (FIG. 2). The found electric angle is supplied to the 2-to-3 phase converter 32 and current detector 156. The electric angle is determined so that an electric period agrees with an electric angle range of 0 to 360 degrees. If the frequency command value is 50 Hz, an electric period is 20 msec, and therefore, an electric angle is generated so that a period of 20 msec agrees with 0 to 360 degrees.

Figure 3:
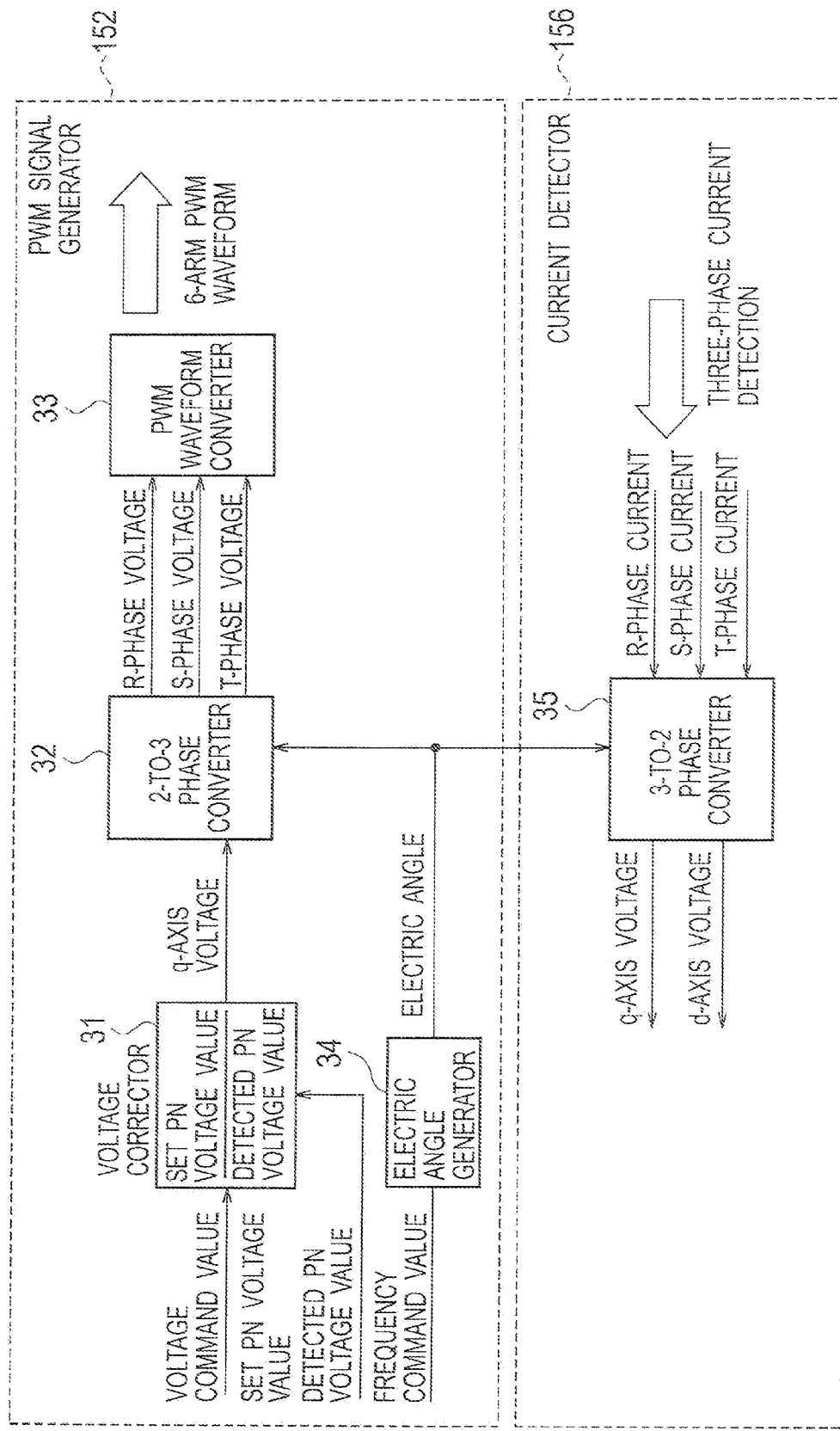
FIG. 3 is a block diagram illustrating a PWM signal generator and a current detector of the inverter of FIG. 2.

The current detector 156 illustrated in FIG. 3 includes a 3-to-2 phase converter 35 that uses the R-, S-, and T-phase currents IR, IS, and IT detected by the ammeter 157 (FIG. 2) and the electric angle from the electric angle generator 34, to provide two-phase current, i.e., d- and q-axis currents to the power consumption calculator 155 (FIG. 2).

A power consumption calculating procedure carried out by the power consumption calculator 155 will be explained. With an externally specified voltage value Va (specified outside the inverter 15), the voltage command value Vb from the voltage command generator 154 (an output voltage of the inverter 15), a three-phase line current I1, the q-axis current Iq, and the d-axis current Id, the power consumption calculator 155 calculates instantaneous power consumption P1 of the load 18 as, $$P_1 = \sqrt{3} \times \frac{Va^2}{Vb/\left(I_1 \times I_q / \sqrt{I_q^2 + I_d^2}\right)}. \quad (1)$$

The denominator of the right side of the expression (1) indicates an impedance of effective power. Representing this impedance with Z, the expression (1) becomes as, $$P_1 = \sqrt{3} \times \frac{(\text{Externally specified voltage})^2}{Z}. \quad (2)$$

The expression (2) expresses the instantaneous power consumption P1 of the load 18 with the externally specified voltage value Va and the impedance Z of effective power. Accordingly, even if a rush current occurs at startup of the load 18 to suddenly decrease the output voltage of the inverter 15, the power consumption calculated by the power consumption calculator 155 will never suddenly drops. Namely, even if the output voltage of the inverter 15 suddenly changes, the rotation speed of the engine 11 is prevented from suddenly varying, and therefore, the engine 11 is stable. When calculating the power consumption P1, the power consumption calculator 155 does not use a voltage output value of the switching circuit 150, and therefore, is not affected by ripples.

The details of the voltage command generator 154 illustrated in FIG. 2 will be explained with reference to FIG. 4. The voltage command generator 154 receives an externally specified voltage value and a minimum output voltage from the outside of the inverter 15, a line current obtained by $(Iq^2+Id^2)^{1/2}$, and an upper current threshold. The voltage command generator 154 includes a multiplier 41 that multiplies the externally specified voltage value by a coefficient G1, a multiplier 42 that multiplies an output signal from the multiplier 41 by a coefficient G2, an operation unit 43, and a low-pass filter 44.

The minimum output voltage is set to be lower than the externally specified voltage value and to be insufficient to break the contactor 18a that controls the start and stop of the load 18.

The multiplier 41 multiplies the externally specified voltage value that is provided from the outside of the inverter 15 by the coefficient G1 that is expressed by, $$G_1 = 1/\{1-(PWM \text{ frequency}) \times (\text{Dead time}) \times 2\} \quad (3).$$

The coefficient G1 expressed with the expression (3) is a coefficient that corrects dead time used when driving the transistors Tr1, Tr3, and Tr5 of the upper arm and the transistors Tr2, Tr4, and Tr6 of the lower arm in the switching circuit 150 of FIG. 10. The dead time is a period during which the upper and lower arms are both OFF and is used to avoid the upper and lower arms from being simultaneously ON. To correct the externally specified voltage value, the coefficient G1 is applied thereto. The dead time may contain an ON/OFF time difference of the transistors of the upper and lower arms.

The multiplier 42 multiplies an output signal from the multiplier 41 by the coefficient G2 that is expressed as follows:

$$G_2 = (\text{Detected } PN \text{ voltage value})/(\text{Set } PN \text{ voltage value}) \quad (4),$$

where the coefficient G2 is set to satisfy a condition of $0 \leq G2 \leq 1$.

The detected PN voltage value in the expression (4) is a voltage value of the main-circuit capacitor 19. The set PN voltage value in the expression (4) is a voltage value set to charge the main-circuit capacitor 19. The coefficient G2 of the expression (4) becomes smaller when the detected PN voltage value of the main-circuit capacitor 19 decreases relative to the set PN voltage value. Even if the power consumption of the load 18 increases when the detected PN voltage value decreases, the multiplication of the coefficient G2 prevents the externally specified voltage value from suddenly increasing.

This is to prevent a stall of the engine 11 that may occur if the inverter 15 increases, when the PN voltage of the main-circuit capacitor 19 is decreasing, output power to the load 18 in response to an increase in the power consumption of the load 18. To prevent this, the embodiment multiplies the externally specified voltage value by the coefficient G2 to decrease an output signal from the multiplier 42 when the detected PN voltage value is lower than the set PN voltage value. This results in decreasing an output voltage from the inverter 15 and preventing the engine 11 from stalling.

Figure 4:
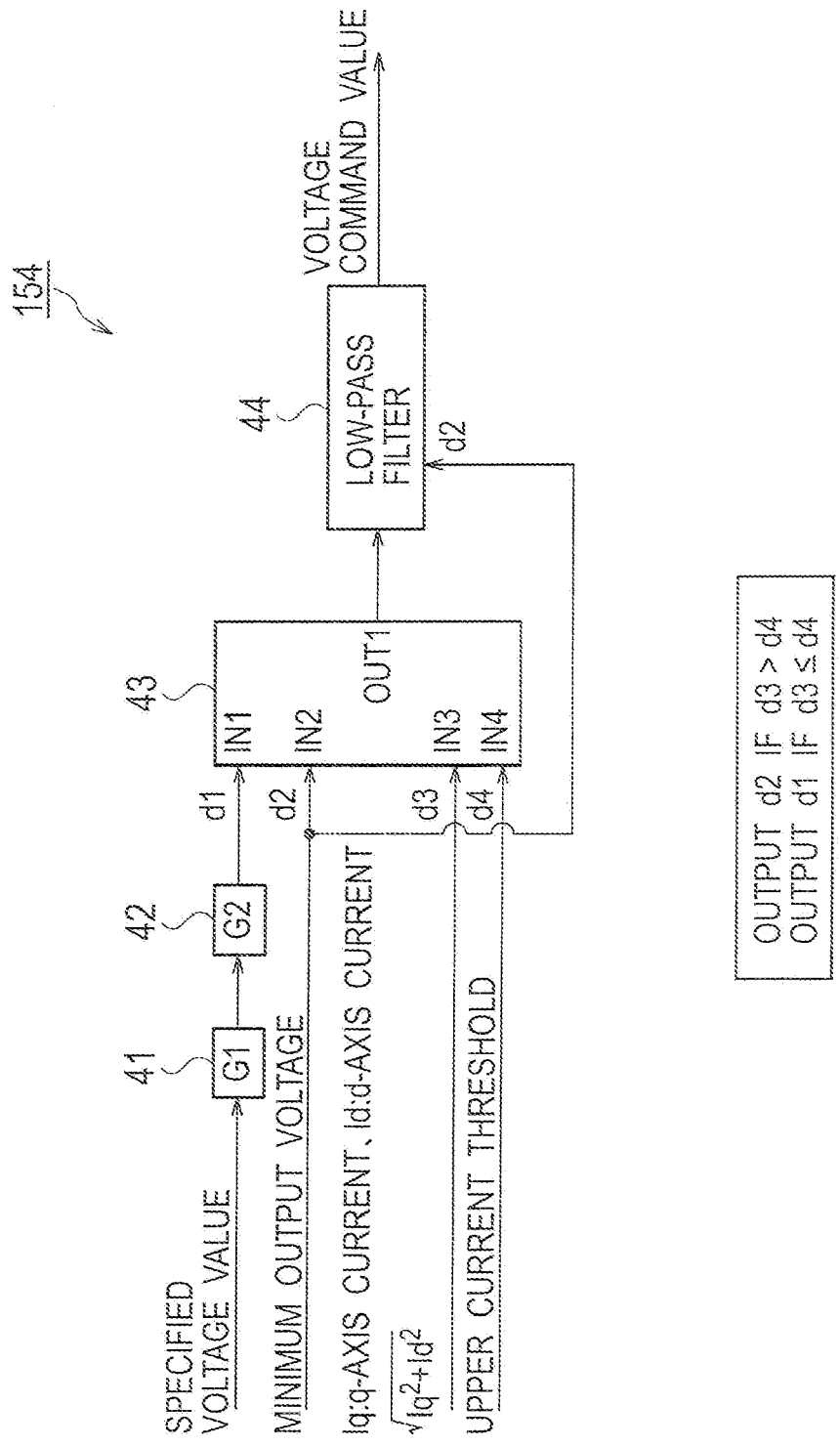
FIG. 4 is a block diagram illustrating a voltage command generator of the inverter of FIG. 2.

The operation unit 43 of the voltage command generator 154 illustrated in FIG. 4 includes input terminals IN1 to IN4 and an output terminal OUT1. The input terminal IN1 receives the output signal d1 from the multiplier 42, the input terminal IN2 receives the minimum output voltage d2 the inverter 15 can output, the input terminal IN3 receives the line current d3 passed to the load 18, and the input terminal IN4 receives the upper current threshold d4 that defines an overcurrent. Based on these pieces of data, the operation unit 43 outputs the minimum output voltage d2 from the output terminal OUT1 in a case of "d3>d4" and the signal d1 in the other cases.

If the line current d3 exceeds the upper current threshold d4, i.e., if the current passing through the load 18 is an overcurrent, the minimum output voltage d2 is outputted as a voltage command value to decrease a voltage supplied to the load 18 and prevent the overcurrent from passing to the load 18.

The output signal (d1 or d2) from the operation unit 43 is supplied to the low-pass filter 44 that is capable of changing gain (G3 and G4 to be explained later).

The low-pass filter 44 is arranged to suppress a rush current to the load 18 at the time of, for example, startup of the load 18. If a rush current occurs, the low-pass filter 44 outputs a voltage command value to immediately decrease the output voltage of the inverter 15, and thereafter, outputs voltage command values to gradually increase the decreased output voltage to the externally specified voltage value. The voltage command value from the low-pass filter 44 is supplied to the PWM signal generator 152 and power consumption calculator 155 illustrated in FIG. 2.

The details of the low-pass filter 44 will be explained with reference to FIG. 5. The low-pass filter 44 carries out a filtering process according to the output signal (d1 or d2) from the operation unit 43 and the minimum output voltage d2 and outputs a voltage command value.

Figure 5:
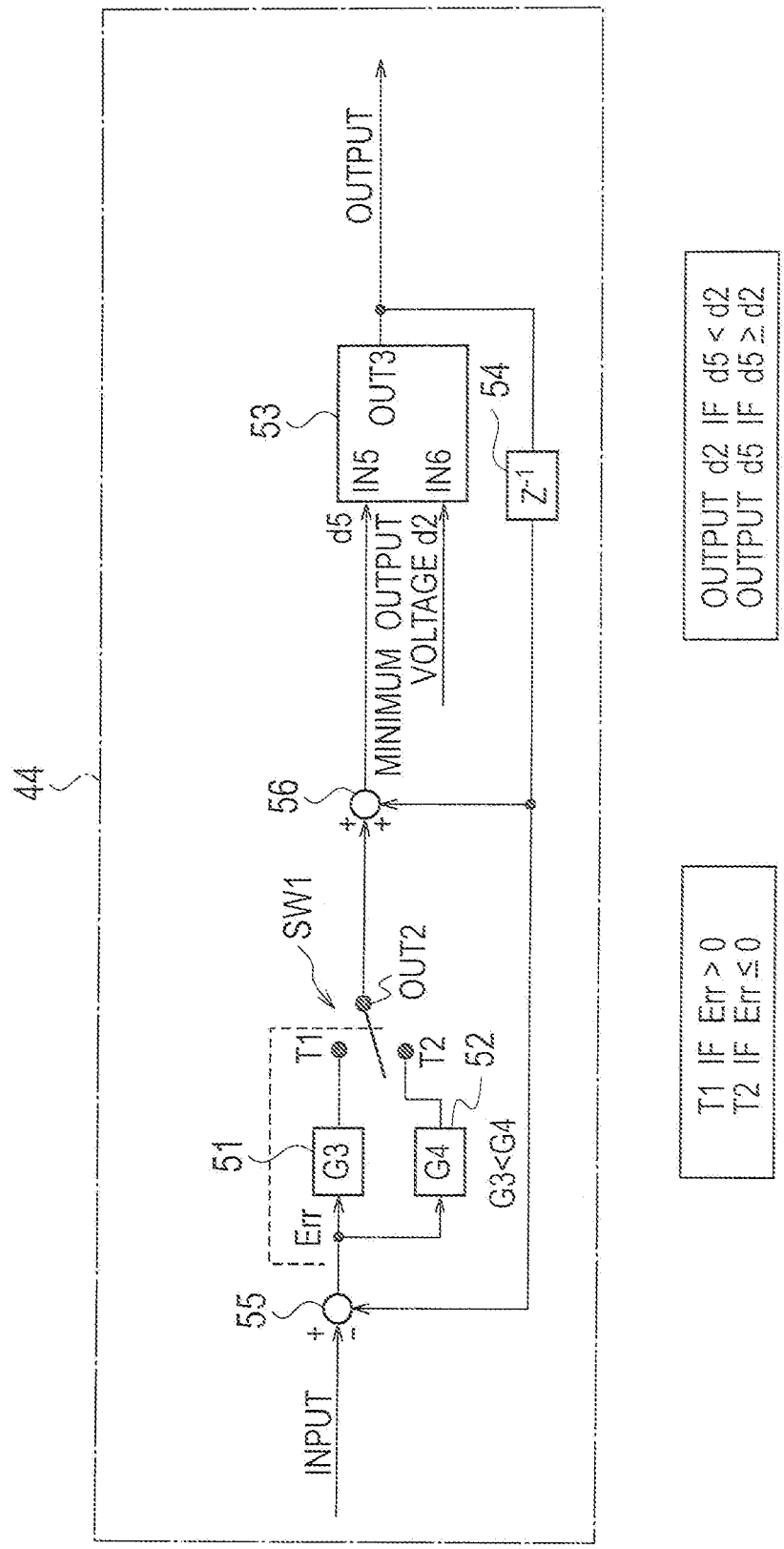
FIG. 5 is a block diagram illustrating a low-pass filter of the voltage command generator of FIG. 4.

As illustrated in FIG. 5, the low-pass filter 44 includes a multiplier 51 employing a coefficient G3, a multiplier 52 employing a coefficient G4, an operation unit 53, a delay unit 54, a subtracter 55, an adder 56, and a switch SW1. The coefficients G3 and G4 are set to satisfy a condition of "G4>G3".

The subtracter 55 calculates a difference between an input signal (the output signal from the output terminal OUT1 of the operation unit 43 illustrated in FIG. 4) and a feedback signal (a preceding output from the operation unit 53) and outputs the difference as a deviation (error) Err.

The multiplier 51 multiplies the deviation Err by the coefficient G3 and outputs the product to a terminal T1 of the switch SW1. The multiplier 52 multiplies the deviation Err by the coefficient G4 and outputs the product to a terminal T2 of the switch SW1.

If the deviation Err is positive (Err>0), the switch SW1 connects the terminal T1 to an output terminal OUT2, to output the output signal of the multiplier 51. If the deviation Err is zero or negative (Err≤0), the switch SW1 connects the terminal T2 to the output terminal OUT2, to output the output signal of the multiplier 52. The output terminal OUT2 is connected to the adder 56, which is connected to an input terminal IN5 of the operation unit 53. An input terminal IN6 of the operation unit 53 receives the minimum output voltage d2 illustrated in FIG. 4.

The adder 56 adds the signal from the output terminal OUT2 of the switch SW1 and the preceding output value from the delay unit 54 to each other and outputs a sum signal d5 to the input terminal IN5 of the operation unit 53.

In a case of d5<d2, the operation unit 53 outputs d2 from an output terminal OUT3, to clamp the output signal of the output terminal OUT3 to the minimum output voltage d2. If d5≥d2, the operation unit 53 outputs d5 from the output terminal OUT3. The output signal from the output terminal OUT3 is supplied as a voltage command value to the PWM signal generator 152 and power consumption calculator 155 illustrated in FIG. 2. The output signal is also supplied as a feedback signal to the delay unit 54 illustrated in FIG. 5.

The output signal delayed by one sampling period in the delay unit 54 is supplied to the subtracter 55 and adder 56. As mentioned above, the switch SW1 multiplies the deviation Err by the coefficient G3 if the deviation Err is positive (Err>0) and by the coefficient G4 (G4>G3) if the deviation Err is zero or negative (Err≤0). Namely, if the externally specified voltage value tends to increase, the switch SW1 uses the smaller coefficient (G3) than if the same tends to decrease. Accordingly, if the voltage command value (OUT1 of FIG. 4) increases after, for example, the occurrence of a rush current, the low-pass filter 44 slows an increasing speed of the voltage command value.

The operation unit 53 of the low-pass filter 44 compares the output signal d5 from the adder 56 with the minimum output voltage d2, and if d5 is lower than d2, i.e., if the sum from the adder 56 is lower than the minimum output voltage d2, outputs the minimum output voltage d2 as a voltage command value to be outputted from the output terminal OUT3. This clamps the externally specified voltage value to the minimum output voltage d2, to prevent, for example, the contactor 18a, which is attached to the load 18 and controls the ON/OFF of the load 18, from being cut off.

Figure 6:
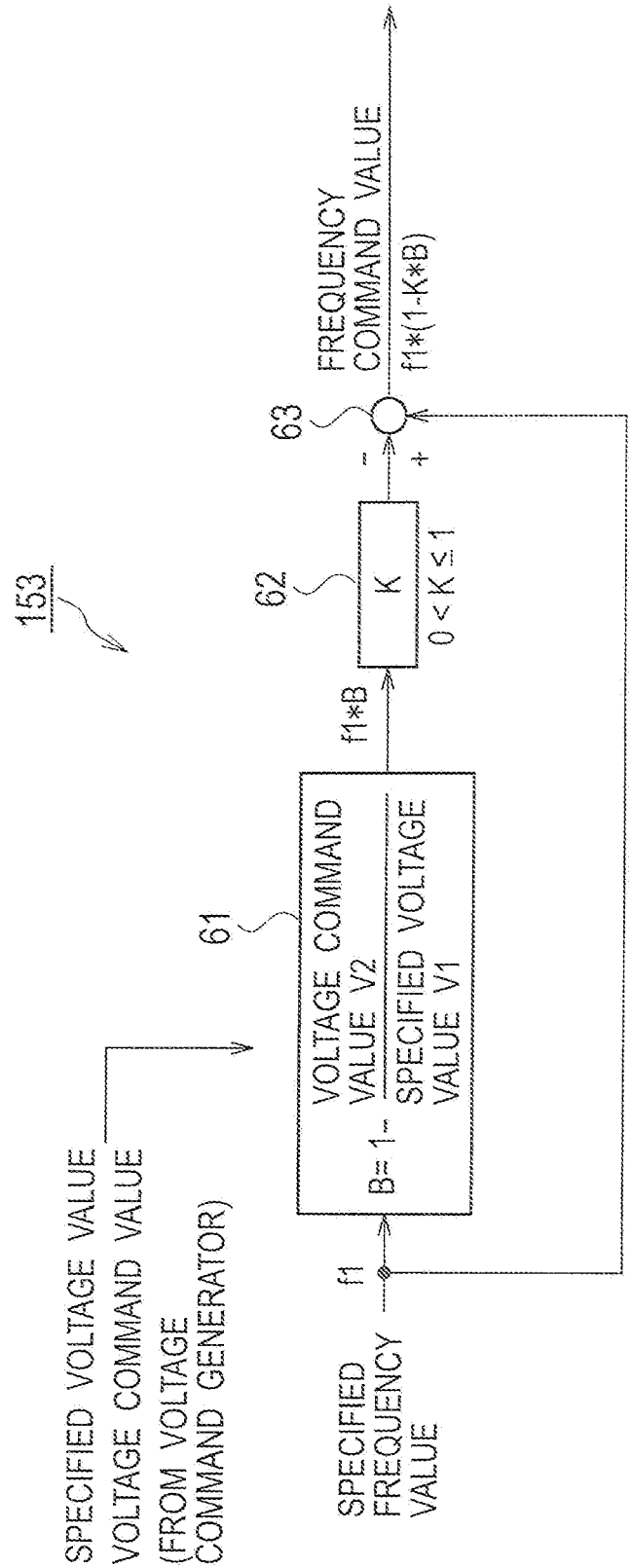
FIG. 6 is a block diagram illustrating a frequency command generator of the inverter of FIG. 2.

The details of the frequency command generator 153 illustrated in FIG. 2 will be explained with reference to FIG. 6. The frequency command generator 153 includes a sweep unit (multiplying factor calculator) 61 that continuously changes, or sweeps, the externally specified frequency value within a predetermined range, a multiplier 62 that multiplies an output from the sweep unit 61 by a coefficient K(0<K≤1), and a subtracter 63.

The sweep unit 61 calculates a multiplying factor B according to the externally specified frequency value specified from the outside of the inverter 15 and outputs the calculated multiplying factor B to the multiplier 62. The multiplying factor B is calculated by, $$B = 1 - \{(\text{Voltage command value } V_2)/(\text{Specified voltage value } V_1)\} \quad (5).$$

A frequency command value $f_c$ to be outputted from the subtracter 63 is obtained by $$(\text{Frequency command value}) = f_1 \times (1 - K \times B) \quad (6).$$

In the expression (6), $f_1$ is the externally specified frequency value and K is the coefficient set in the multiplier 62 and satisfies a relationship of 0<K≤1.

If the externally specified voltage value V1 is 200 volts, the voltage command value V2 is 140 volts, and the externally specified frequency value is f1, B will be 0.3 according to the expression (5). Accordingly, the sweep unit 61 outputs a signal of "$0.3 \times f_1$". If the coefficient K set in the multiplier 62 is 0.5, the multiplier 62 provides an output signal of "$0.15 \times f1$", which is supplied to the subtracter 63. The subtracter 63 provides an output signal of "$0.85 \times f_1$" that is 15% lower than the externally specified frequency value f1 and is outputted as a frequency command value.

Thereafter, the voltage command value V2 increases to agree with the externally specified voltage value V1. Then, the multiplying factor B according to the expression (5) becomes zero, and therefore, the externally specified frequency value $f_1$ is not subtracted by the subtracter 63 and is outputted as it is as a frequency command value. In this way, the externally specified frequency value is continuously changed or swept within the range of "0.85×f1" to f1. Gradually increasing the frequency command value up to the externally specified frequency value f1 results in efficiently supplying energy to the load 18 when the load 18 is an induction load such as an induction motor. This results in shortening a startup time of the load 18 and reducing load on the engine 11 and converter 14.

Figure 8:
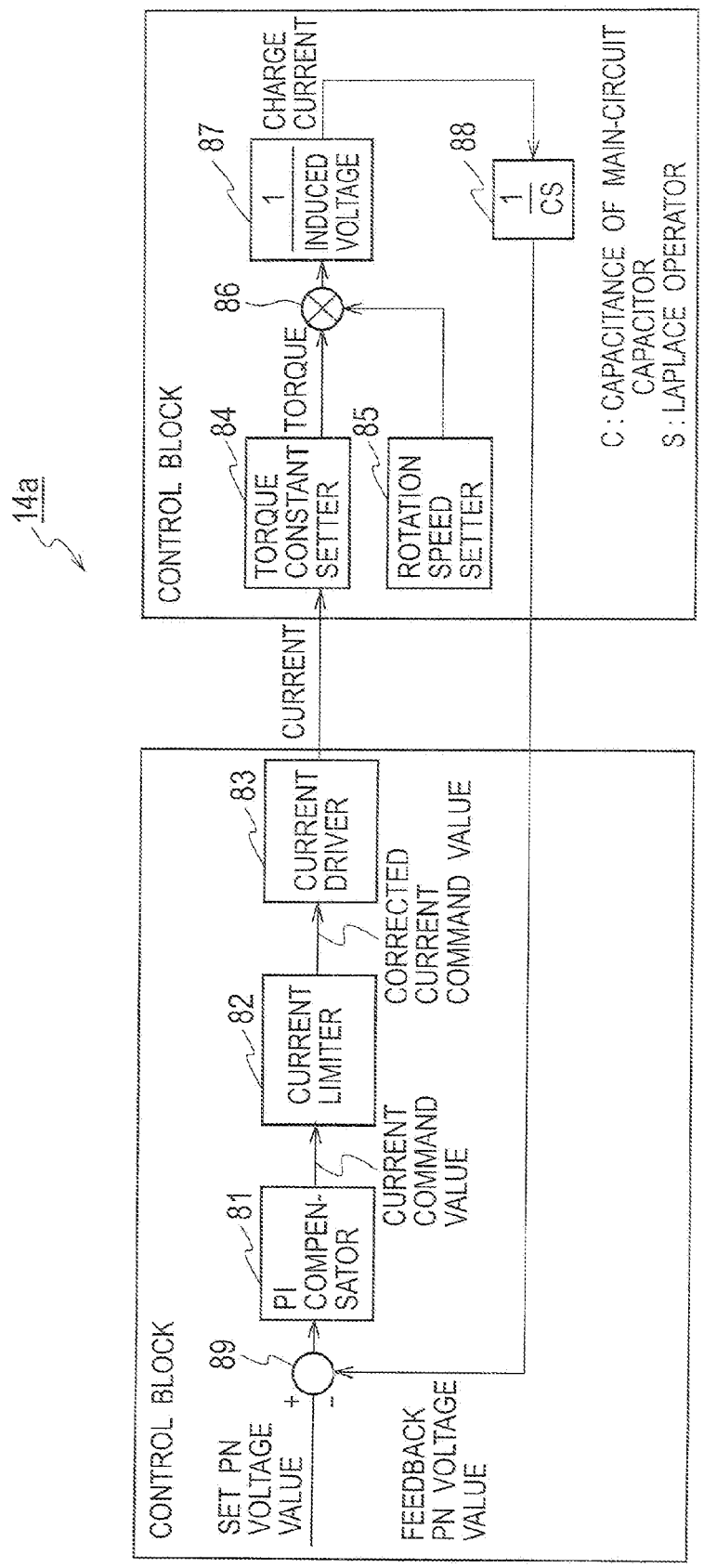
FIG. 8 is a block diagram illustrating an output current controller of a converter of the inverter power generator of FIG. 1.

FIG. 8 is a block diagram illustrating the current controller 14a arranged in the converter 14 of FIG. 1. The details of the current controller 14a and a PN voltage control operation carried out thereby will be explained with reference to FIG. 8. In the current controller 14a, a PN voltage control block includes a PI compensator (current command generator) 81, a current limiter 82, and a current driver 83. In a controlled block of the current controller 14a, a torque constant and a rotation speed determine a current and power and the current and power determine a voltage to charge the main-circuit capacitor 19. A PN voltage of the capacitor 19 is detected and is subtracted from a set PN voltage value by a subtracter 89.

The subtracter 89 calculates a voltage difference (a deviation voltage) between a set PN voltage value of this time that is inputted in time series at a predetermined sampling period and a feedback PN voltage value outputted from an integrator 88 that is based on a preceding PN voltage value. The PI compensator 81 multiplies the voltage difference from the subtracter 89 by a PI compensation value and outputs a result of the multiplication as a current command value to the current limiter 82.

Figure 9:
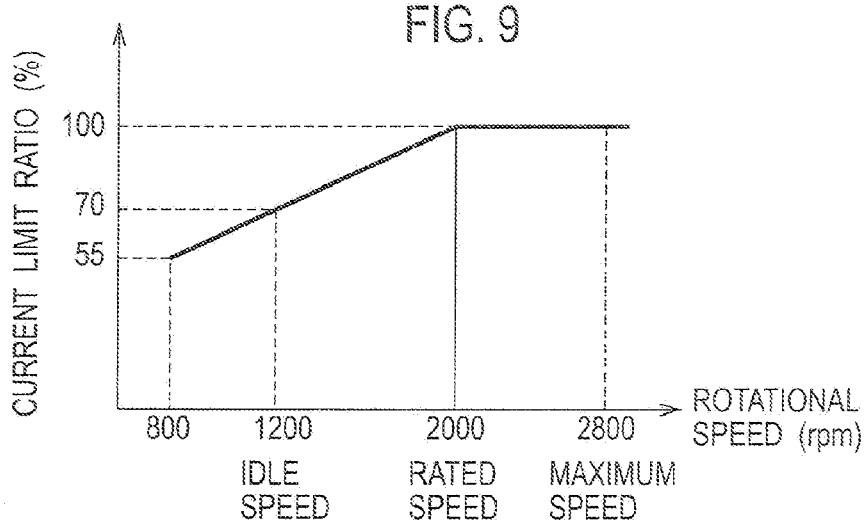
FIG. 9 is a current limit ratio table adopted by the inverter power generator and indicating a relationship between engine speed and current limit ratio.

The current limiter 82 has a current limit ratio table illustrated in FIG. 9. The current limit ratio table specifies a current limit ratio with respect to a given rotation speed of the engine 11. According to the embodiment, the rotational speed of the engine 11 is equal to the rotational speed of the synchronous motor 13. When a rotational speed of the engine 11 is given, the current limiter 82 refers to the current limit ratio table, finds a current limit ratio corresponding to the given rotational speed, and multiplies the current command value from the PI compensator 81 by the current limit ratio. If the engine 11 is at a rotation speed of, for example, 1200 rpm that is an idle speed of the engine 11 and is lower than a rated speed of the engine 11 (the rated speed of the engine 11 being equal to a rated speed of the synchronous motor 13), a current limit ratio corresponding to the engine speed is 70% that is lower than 100% as illustrated in FIG. 9. With the found current limit ratio, the current limiter 82 corrects the current command value from the PI compensator 81 and outputs the corrected current command value to the current driver 83. If the engine 11 is at the rated speed (2000 rpm), the current limit ratio will be 100%. In this case, the current limiter 82 outputs the current command value from the PI compensator 81 as it is as the corrected current command value to the current driver 83.

The current limit ratio table illustrated in FIG. 9 is prepared so that the current limit ratio gradually increases up to 100% as the rotational speed of the engine 11 increases from the idle speed (1200 rpm) up to the rated speed (2000 rpm).

Namely, the current limit ratio table specifies a current limit ratio lower than 100% if the synchronous motor 13 is at the idle speed of the engine (prime mover) 11 and linearly increases the current limit ratio up to 100% according to an increase in the rotation speed of the synchronous motor 13. Although the current limit ratio table illustrated in FIG. 9 linearly increases the current limit ratio between the idle speed and rated speed of the engine 11, it may increase the current limit ratio along a curve with respect to an increase in the rotational speed of the engine 11.

The current driver 83 illustrated in FIG. 8 controls a current to be outputted from the synchronous motor 13 according to the corrected current command value from the current limiter 82. The current limit ratio used by the current limiter 82 decreases as the rotational speed of the engine 11 decreases from the rated speed, to reduce load on the engine 11 and prevent the engine 11 from stalling.

When the inverter 15 supplies power to the load 18 by use of power accumulated in the main-circuit capacitor 19, the voltage of the capacitor 19 decreases, and therefore, the converter 14 tries to raise the PN voltage value of the capacitor 19 to a set PN voltage value by pulling energy from the engine 11 through the synchronous motor 13. The converter 14 can smoothly conduct this operation with the help of the output current limiter 14a.

Operation of the inverter power generator 100 with the above-mentioned configuration will be explained.

FIG. 11 is a timing chart illustrating signal waveforms of the inverter power generator 100 of the current controller 14a without current limit operation as a reference case. FIG. 12 is a timing chart illustrating signal waveforms of the inverter power generator 100 as the current limit operation is carried out by the current controller 14a. In FIGS. 11 and 12, (a) illustrates a converter current provided by the converter 14, (b) the rotational speed of the engine 11, (c) the PN voltage of the main-circuit capacitor 19, and (d) estimated power consumption.

The case of not carrying out the current limit operation by the current controller 14a will be explained with reference to FIG. 11. It is presumed that the engine 11 is at the idle speed (1200 rpm). At time t21, the load 18 suddenly becomes heavy and the inverter 15 supplies large power to the load 18. As a result, the PN voltage of the main-circuit capacitor 19 decreases as illustrated in of FIG. 11(c). To increase the lowered PN voltage of the capacitor 19, the converter 14 pulls energy from the engine 11 by supplying a 100% current to the engine 11 and supplies power to the capacitor 19.

Figure 11A:
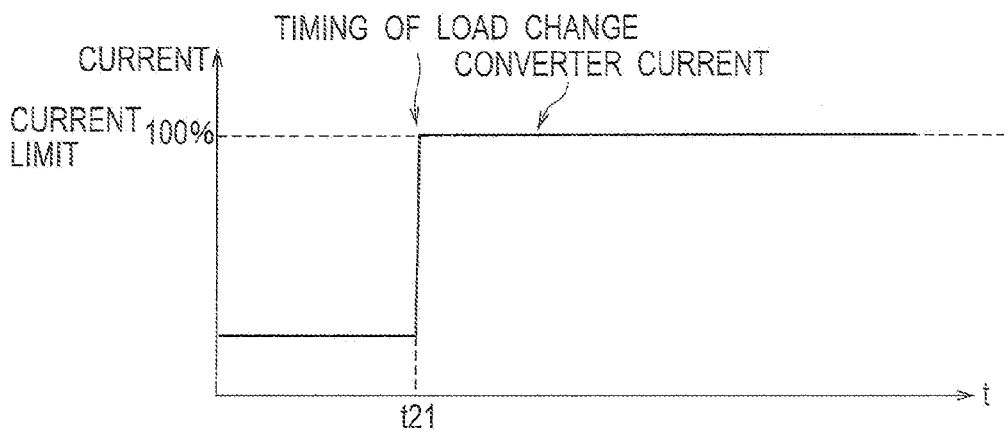
FIG. 11 is a timing chart illustrating signals of the inverter power generator of FIG. 1 without a current limit operation as a reference case.
Figure 11B:
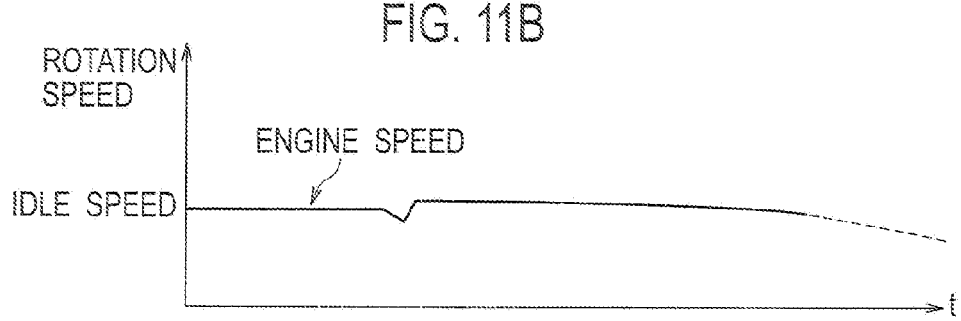
Figure 11C:
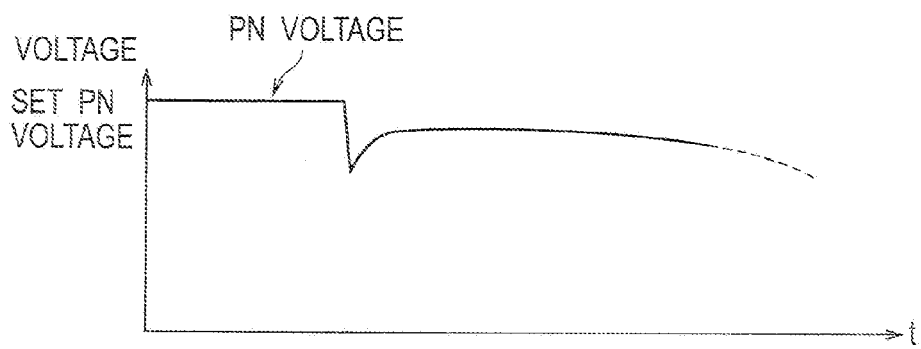
Figure 11D:
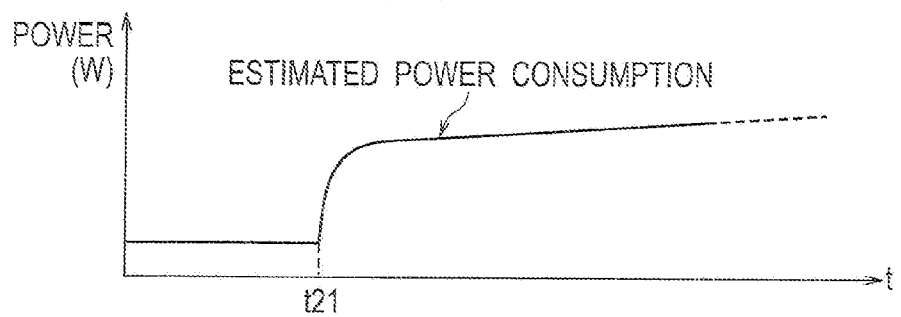

As illustrated in FIG. 11(d), the estimated power consumption calculated by the inverter 15 increases, and therefore, the engine 11 tries to increase its rotational speed. However, the maximum output torque of the engine 11 is limited. The engine 11 running at the idle speed (1200 rpm) has a small margin to stall, and therefore, the engine 11 is unable to increase its rotational speed. In addition, the converter 14 maintains the current limited state as illustrated by FIG. 11(a). In consequence, the rotational speed of the engine 11 gradually decreases as illustrated in FIG. 11(b).

Since the engine 11 is unable to increase its rotational speed, the PN voltage of the main-circuit capacitor 19 is unable to return to the set PN voltage value as illustrated by FIG. 11(c). In addition, the converter current illustrated by FIG. 11(a) does not decrease lower than the current limit value. Accordingly, the engine 11 approaches a stall. In this way, if the current limit operation of the current control part 14a according to the embodiment is not carried out, the engine 11 easily stalls if a sudden load change occurs when the engine 11 is operating at around the idle speed.

Figure 12A:
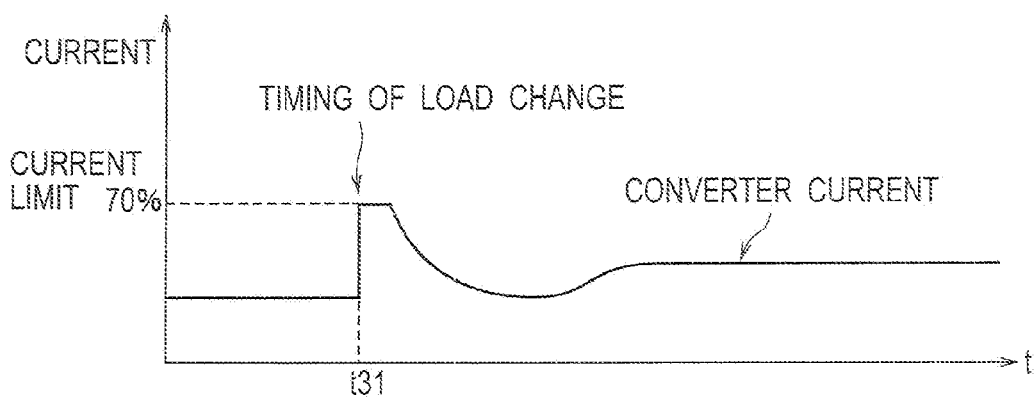
FIG. 12 is a timing chart illustrating signals of the inverter power generator of FIG. 1 with the current limit operation.
Figure 12B:
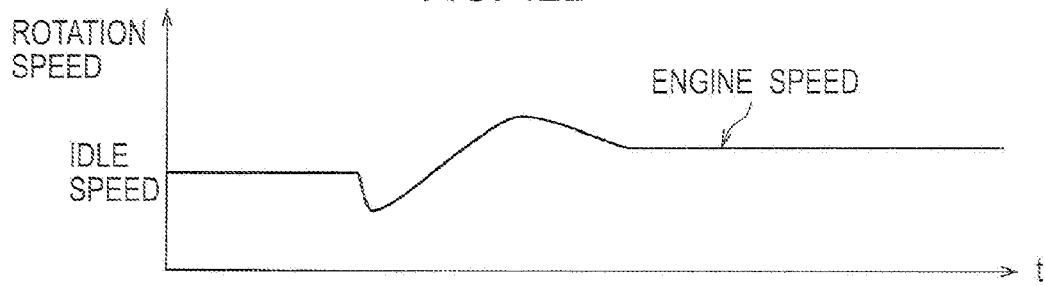
Figure 12C:
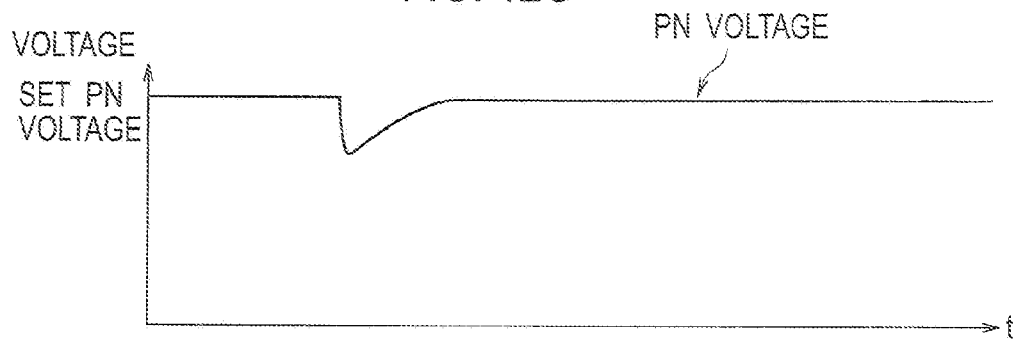

Next, the case of carrying out the current limit control by the current control part 14a according to the embodiment will be explained. It is presumed that the engine 11 is operating at the idle speed (1200 rpm). At time t31, the load 18 suddenly becomes heavy and the inverter 15 supplies large power to the load 18. As a result, the EN voltage of the main-circuit capacitor 19 decreases as illustrated by FIG. 12(c). To increase the lowered PN voltage of the capacitor 19, the converter 14 pulls energy from the engine 11 by supplying a current to the engine 11 and supplies power to the capacitor 19. At this time, the current limit ratio is 70% as illustrated in FIG. 9 because the engine 11 is at the idle speed. The current limiter 82 limits a current command value with the current limit ratio of 70% and outputs a corrected current command value, which is used to control the converter current illustrated in FIG. 12(a).

Figure 12D:
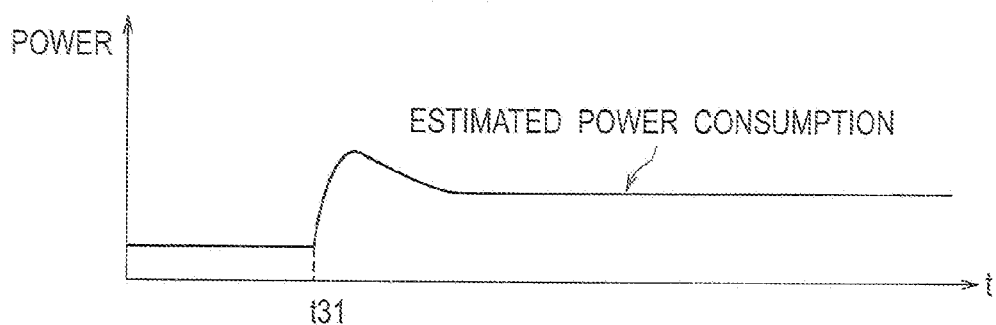

At this time, the estimated power consumption calculated by the inverter 15 increases as illustrated in FIG. 12(d), and therefore, the engine 11 tries to increase its rotational speed. At this time, the corrected current command value is 70% of the original current command value, and therefore, a torque demand for the engine 11 is smaller than that with the 100% current command value. As a result, the engine 11 can properly increase its rotational speed as illustrated in (b) of FIG. 12. This prevents the engine 11 from stalling.

The PN voltage of the main-circuit capacitor 19 starts to decrease at time t31 as illustrated in (c) of FIG. 12, and after a relatively long time, returns to the set PN voltage value. Although the restoration time to the set PN voltage value is relatively long, the engine 11 can increase its rotational speed without a stall and the converter current keeps lower than the limit value as illustrated in FIG. 12(a). As a result, the PN voltage of the capacitor 19 gradually returns to the set PN voltage value. In this way, the embodiment uses a current limit ratio lower than 100% to limit the current command value for commanding the synchronous motor 13 if the engine 11 is operating at around the idle speed, thereby supplying the converter current without stalling the engine 11.

As mentioned above, the inverter power generator 100 according to the embodiment arranges the current control part 14a for the converter 14 in order to set a current limit ratio. The current limit ratio is linearly increased as the rotation speed of the engine 11 is increased from an idle speed up to a rated speed. Even if the load 18 causes a sudden change when the engine 11 is running at around the idle speed with a small torque variation margin, the rotational speed of the engine 11 can properly be increased by limiting a current command value for the synchronous motor 13 to a low value. As a result, the PN voltage of the main-circuit capacitor 19 can properly be returned to a set PN voltage value.

To operate the engine 11 in a manner to save energy, the engine 11 must be driven at around an idle speed when the power consumption of the load 18 is low. At the idle speed, the engine 11 produces small torque and has a small controllable speed margin with respect to a load increase. Accordingly, the engine 11 easily stalls when the power consumption of the load 18 increases. The increase of the power consumption of the load 18 causes a decrease in the PN voltage of the main-circuit capacitor 19 and may cause an event to draw 100% power from the engine 11, thereby more easily stalling the engine 11. To avoid this problem, the present embodiment limits a current command value for the engine 11 (synchronous motor 13), thereby suppressing the torque of the engine 11 and preventing the engine 11 from stalling.

Although the present invention has been explained with reference to the embodiment, the present invention is not limited to the embodiment. The configuration of any part of the embodiment is replaceable with any other configuration that may provide like functions.

For example, the ammeter 157 arranged for three phase in FIG. 2 may be arranged for two among the three phases.

In summary, an inverter power generator provided according to the present invention employs an output current limiter to limit a converter current if the power consumption of a load suddenly changes when a synchronous motor coupled with an engine is operating at a rotation speed lower than a rated speed, for example, at around ah idle speed. The output current limiter multiplies a current command value for specifying a converter current by a ratio smaller than 100%, to decrease the current command value so that the rotational speed of the engine becomes reasonably increasable. This prevents the engine from stalling when the power consumption of the load suddenly varies.

The present invention is applicable to improve the efficiency of any inverter power generator.

This application claims benefit of priority under 35 USC §119 to Japanese Patent Application No. 2011-054516, filed on Mar. 11, 2011, the entire contents of which are incorporated by reference herein.

What is claimed is:

1. An inverter power generator comprising:

a prime mover;

a synchronous motor coupled with the prime mover, wherein the prime mover is configured to rotate the synchronous motor to generate AC power;

a converter connected to the synchronous motor, the converter configured to convert the AC power from the synchronous motor into DC power;

an inverter connected to the converter, the inverter configured to invert the DC power from the converter into AC power of a required frequency; and a capacitor arranged between the converter and the inverter, wherein:

the converter includes a current controller configured to set a current limit ratio according to a rotation speed of the synchronous motor and to limit a converter current according to the current limit ratio; and the current controller is configured to set the current limit ratio lower than 100% when the synchronous motor is at a predetermined rotation speed lower than a rated rotation speed and linearly increase the current limit ratio up to 100% according to an increase in the rotational speed of the synchronous motor, wherein:

the converter includes a current command generator configured to generate a current command value according to a difference between a set PN voltage value serving as a voltage command value to charge the capacitor and a feedback PN voltage value from the capacitor;

the current controller includes:

a current limiter that is connected after the current command generator, the current limiter including a current limit ratio table indicating a relationship between rotation speed of the synchronous motor and current limit ratio, the current limiter configured to determine a current limit ratio according to a given rotation speed of the synchronous motor and the current limit ratio table and limit the current command value of the current command generator with the determined current limit ratio; and a current driver configured to control an output current according to the limited current command value from the current limiter; and the current limit ratio table is configured to specify a current limit ratio lower than 100% if the synchronous motor is at the predetermined rotation speed lower than the rated rotational speed and linearly increase the current limit ratio up to 100% according to an increase in the rotational speed of the synchronous motor.

* * * * *